(12) United States Patent
Appaji

(10) Patent No.: US 7,818,405 B2
(45) Date of Patent: Oct. 19, 2010

(54) METHOD AND SYSTEM FOR PROVIDING DEVICE-INITIATED SOFTWARE UPGRADES

(75) Inventor: Anuradha K. Appaji, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 952 days.

(21) Appl. No.: 11/170,924

(22) Filed: Jun. 30, 2005

(65) Prior Publication Data

US 2007/0006207 A1    Jan. 4, 2007

(51) Int. Cl.
*G06F 9/44* (2006.01)
(52) U.S. Cl. .................. 709/221; 717/171
(58) Field of Classification Search ........... 709/220; 717/168
See application file for complete search history.

(56) References Cited

U.S. PATENT DOCUMENTS

| | | | | |
|---|---|---|---|---|
| 6,633,835 | B1 * | 10/2003 | Moran et al. | 702/190 |
| 6,735,434 | B2 * | 5/2004 | Criss et al. | 455/418 |
| 2002/0103900 | A1 * | 8/2002 | Cornelius et al. | 709/224 |
| 2005/0120040 | A1 * | 6/2005 | Williams et al. | 707/102 |
| 2005/0223374 | A1 * | 10/2005 | Wishart et al. | 717/173 |
| 2006/0106806 | A1 * | 5/2006 | Sperling et al. | 707/10 |
| 2006/0190938 | A1 * | 8/2006 | Capek et al. | 717/161 |

* cited by examiner

*Primary Examiner*—Patrice Winder

(57) ABSTRACT

A method for providing device-initiated software upgrades in a network comprising a plurality of devices is provided. The method includes identifying in the device an upgrade time window based on a set of predetermined conditions stored in the device and initiating in the device a software upgrade during the upgrade time window.

20 Claims, 2 Drawing Sheets

METHOD AND SYSTEM FOR PROVIDING DEVICE-INITIATED SOFTWARE UPGRADES

TECHNICAL FIELD OF THE INVENTION

The present invention relates generally to networks and, more specifically, to a method and system for providing device-initiated software upgrades in a network.

BACKGROUND OF THE INVENTION

Wireless communications systems, including cellular phones, paging devices, personal communication services (PCS) systems, and wireless data networks, have become ubiquitous in society. These types of wireless networks, in addition to other types of networks, generally include many devices that operate using software that has to be updated occasionally.

Currently implemented networks typically provide for an operator to determine, for each device, that a software upgrade should be downloaded into the device and an appropriate time for downloading the upgrade. These operators usually schedule software upgrades around midnight because of the perception that traffic is reduced at that time. However, the assumption that a particular time is best for downloading the upgrade may be false. Furthermore, requiring an operator to track which devices need software upgrades and to perform the upgrades manually results in the operator having to perform a repetitive, non-valuable task that greatly increases operational expenditures in maintaining the network.

Therefore, there is a need in the art for an improved software upgrade process in wireless and other networks. In particular, there is a need for a network that provides for software upgrades that are not dependent on operator intervention and on operator assumptions for selecting download times.

SUMMARY OF THE INVENTION

In accordance with the present invention, a method and system for providing device-initiated software upgrades are provided that substantially eliminate or reduce disadvantages and problems associated with conventional methods and systems.

To address the above-discussed deficiencies of the prior art, it is a primary object of the present invention to provide a method for providing device-initiated software upgrades. According to an advantageous embodiment of the present invention, the method comprises identifying in the device an upgrade time window based on a set of predetermined conditions stored in the device and initiating in the device a software upgrade during the upgrade time window.

According to one embodiment of the present invention, the method includes monitoring conditions in the device and the upgrade time window is identified based on a match between at least a portion of the predetermined conditions and the monitored conditions.

According to another embodiment of the present invention, initiating the software upgrade comprises placing the device in a prioritized mode during the software upgrade.

According to still another embodiment of the present invention, initiating the software upgrade further comprises connecting the device to a server that is operable to store a software load for the device, obtaining software load information from the server, and determining whether the software load stored in the server for the device comprises a different software load from a software load stored in the device based on the software load information.

According to yet another embodiment of the present invention, the method includes downloading onto the device the software load stored in the server for the device when the software load stored in the server for the device comprises a different software load from the software load stored in the device.

According to a further embodiment of the present invention, the method includes submitting a new software load request to the server when the software load stored in the server for the device comprises a same software load as the software load stored in the device.

According to a still further embodiment of the present invention, the method includes submitting a device report to the server when the software load stored in the server for the device comprises the same software load as the software load stored in the device.

According to yet a further embodiment of the present invention, at least a portion of the predetermined conditions comprise corresponding significance values and the upgrade time window is also identified based on the significance values.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
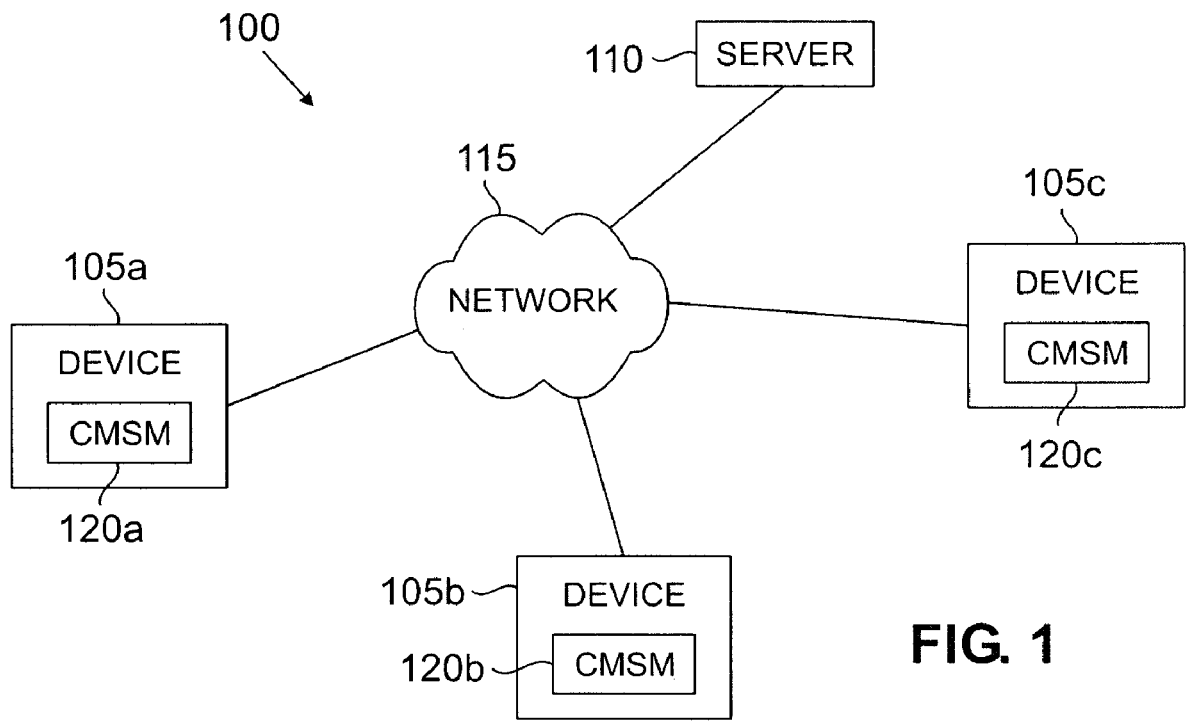
FIG. 1 illustrates a system for providing device-initiated software upgrades according to the principles of the present invention.
Figure 2:
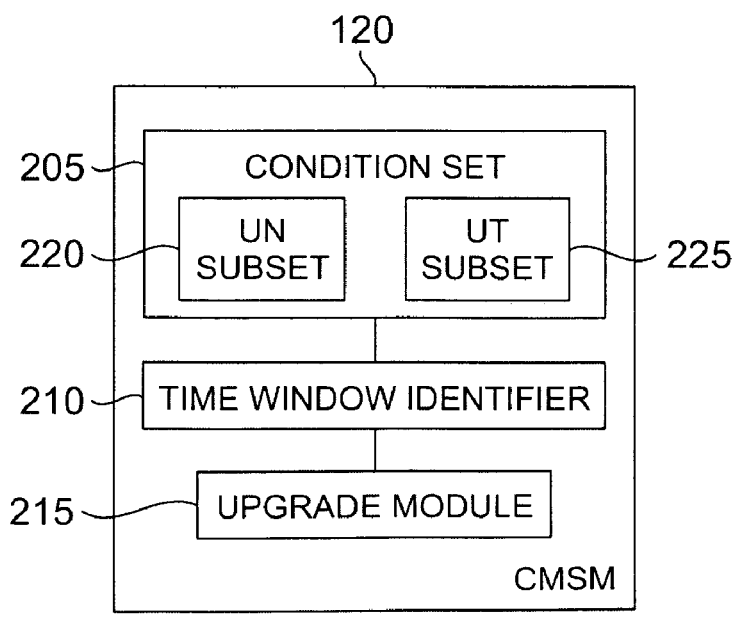
FIG. 2 illustrates details of the condition monitoring software module of FIG. 1 according to the principles of the present invention.
Figure 3:
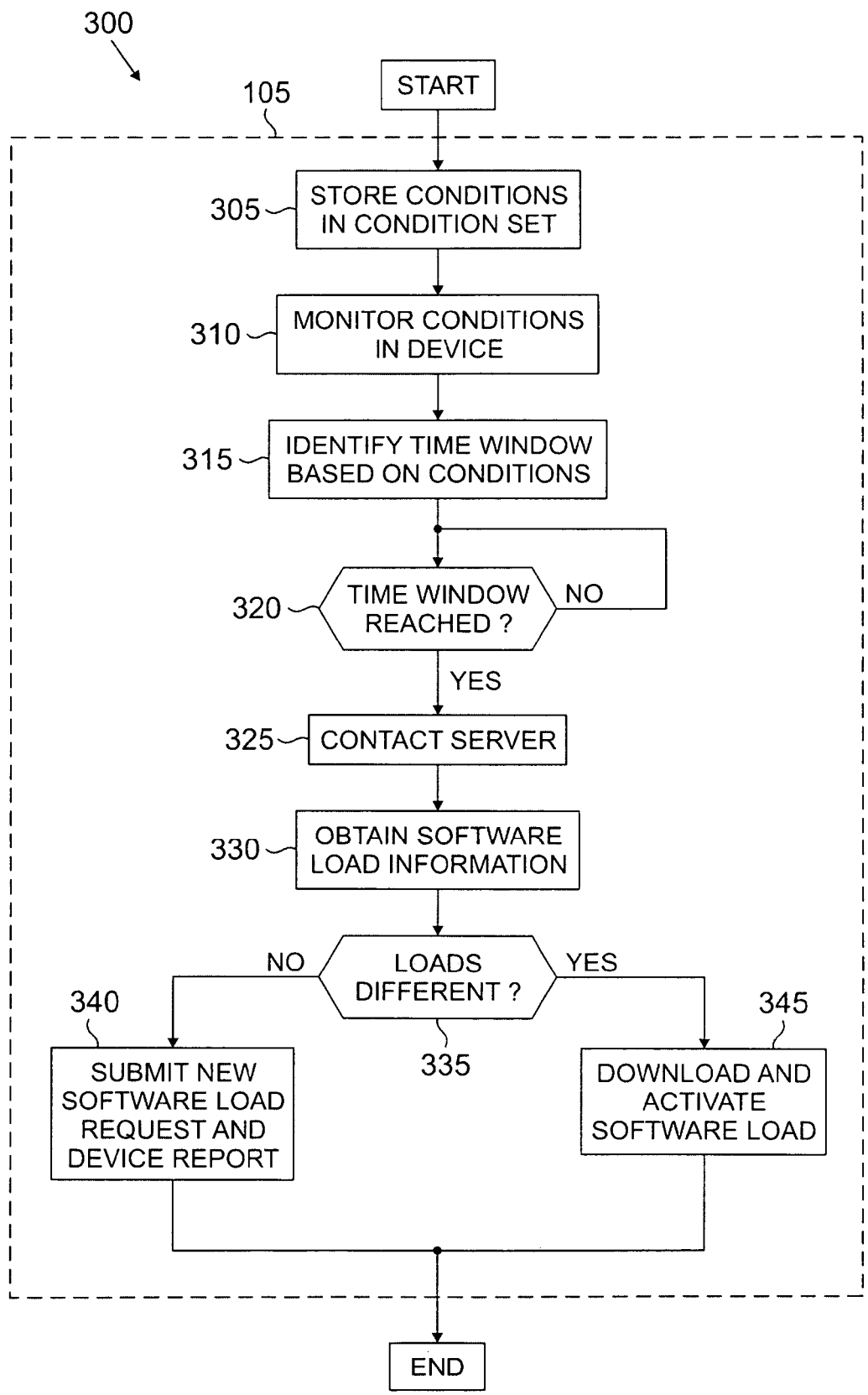
FIG. 3 is a flow diagram illustrating a method for providing device-initiated software upgrades in the system of FIG. 1 according to the principles of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged network.

FIG. 1 illustrates a system 100 for providing device-initiated software upgrades according to the principles of the present invention. System 100 comprises a plurality of devices 105a-c, at least one server 110, and a network 115. Devices 105 and server 110 are operable to communicate with each other through network 115, which may comprise any suitable combination of communication lines, servers, sub-networks and/or additional components. Although the illustrated embodiment comprises three devices 105a-c, and one server 110, it will be understood that system 100 may comprise any suitable number of devices 105 and servers 110 without departing from the scope of the present invention.

For one particular embodiment, system 100 may comprise a wireless network and devices 105 may comprise base stations and other suitable wireless network components. However, it will be understood that system 100 may comprise any suitable type of network and devices 105 may comprise any devices operable to use software in operation.

Server 110 is operable to store a plurality of software loads for devices 105 and to communicate with each device 105 to allow the device 105 to download an upgraded software load. Each device 105 comprises a condition monitoring software module (CMSM) 120 that is operable to monitor conditions for the device 105 in order to identify a suitable upgrade time window for the device 105 to initiate a software upgrade from server 110. At some time within that upgrade time window, CMSM 120 is also operable to initiate the software upgrade for device 105. Thus, each device 105 is operable to initiate software upgrades automatically when a set of predetermined conditions is satisfied that indicates a software upgrade is desired and the time is favorable for downloading the upgrade.

FIG. 2 illustrates details of condition monitoring software module (CMSM) 120 according to the principles of the present invention. CMSM 120 comprises a condition set 205, a time window identifier 210, and an upgrade module 215. It will be understood that any of the features described with respect to any of these components 205, 210 and/or 215 may be combined in any suitable manner and that the division of these features into the three components 205, 210 and 215 as described below is only one possible embodiment of CMSM 120.

Condition set 205 comprises a data store that is operable to store a plurality of conditions for identifying an upgrade time window for performing a software upgrade process. For one embodiment, an operator may store conditions in and delete conditions from condition set 205 at device 105 and/or remotely over network 115. For other embodiments, CMSM 120 may also be operable to learn conditions from reports submitted to server 110 by similar devices 105 and to store those conditions in condition set 205.

For one embodiment, conditions stored in condition set 205 may comprise an upgrade need (UN) subset 220 of conditions and an upgrade time (UT) subset 225 of conditions. Upgrade need subset 220 comprises conditions that indicate that a software upgrade may be needed or desired. For example, these conditions may comprise a number of critical faults, a number of major faults, a number of critical alarms and/or a number of major alarms, in addition to the nature of any faults or alarms, abnormal resource usage, an amount of elapsed time after a previous software upgrade, and the like.

For a particular embodiment, each condition stored in upgrade need subset 220 comprises a corresponding significance value that is stored with the condition. The significance value is operable to identify how significant the corresponding condition is in determining the possibility of a need or desire for a software upgrade.

Upgrade time subset 225 comprises conditions that indicate when a suitable time would be for performing a software upgrade process. For example, these conditions may comprise times of day, daily usage, traffic distribution related to different times of day, and the like.

Time window identifier 210 is coupled to condition set 205 and is operable to monitor the conditions of device 105 in order to identify an upgrade time window for device 105 to perform a software upgrade. Thus, time window identifier 210 is initially operable to determine that a software upgrade may be needed or desired by device 105 by finding a match between the monitored conditions of device 105 and the conditions stored in condition set 205 or, for a particular embodiment, in upgrade need subset 220.

Time window identifier 210 may be operable to find a match according to any suitable method. For example, time window identifier 210 may be operable to determine whether a particular number of critical faults have occurred, whether a particular number of faults or alarms of a particular nature have occurred, whether a particular amount of time has elapsed since a previous upgrade, whether any other suitable conditions stored in condition set 205 have occurred and/or whether any of a plurality of possible combinations of these or other suitable conditions have occurred.

For the embodiment in which condition set 205 is operable to store significance values corresponding to the conditions, time window identifier 210 may also be operable to find a match based on the significance values. For example, time window identifier 210 may be operable to add the significance values for all conditions that have occurred and, when a group threshold value is reached, to find a match based on that group threshold value. In addition to or instead of this example, time window identifier 210 may be operable to track the number of occurrences for each particular condition or for a particular subset of conditions and, when an individual threshold value is reached for any of these conditions, to find a match based on that individual threshold value.

Time window identifier 210 is also operable to determine when a suitable time would be for device 105 to perform a software upgrade process by finding a match between the monitored conditions in device 105 and the conditions stored in condition set 205 or, for a particular embodiment, in upgrade time subset 225.

Time window identifier 210 may be operable to find a match according to any suitable method. For example, time window identifier 210 may be operable to determine whether a particular day or time of day matches a daily usage statistic condition, whether a particular time of day matches a traffic distribution condition, whether any other suitable conditions stored in condition set 205 match and/or whether any of a plurality of possible combinations of these or other suitable conditions match.

Based on the conditions that time window identifier 210 has determined are matched, time window identifier 210 is operable to identify an upgrade time window during which device 105 may initiate a software upgrade process that will be least likely to interfere with operation of device 105.

Upgrade module 215 is coupled to time window identifier 210 and is operable to initiate the software upgrade process for device 105 during the upgrade time window identified by time window identifier 210. Upgrade module 215 is operable to contact server 110 to begin communication during the upgrade time window and to obtain from server 110 software load information, such as a version number for the software load, a bug fix report and/or any other suitable information.

Upgrade module 215 is also operable to determine whether the load available from server 110 is different from the load already operating on device 105 based on the software load information obtained from server 110. If the loads are the same, upgrade module 215 is operable to submit a new software load request to server 110. The new software load request is operable to notify server 110 that device 105 desires or needs an updated software load that is currently unavailable on server 110. Upgrade module 215 may also be operable to submit a device report to server 110 when the loads are the same. The device report is operable to provide the current operating status of device 105 in order to assist in identifying the basis for the new software load request.

For one embodiment, upgrade module 215 may be operable to send a reattempt signal to time window identifier 210 that is operable to notify time window identifier 210 of the absence of an updated software load in server 110. In response to the reattempt signal, time window identifier 210 may be operable to delay for a specified period of time before identifying a new upgrade time window for reattempting the software upgrade. For another embodiment, server 110 may initiate the upgrade process when the new software load is available or may notify device 105 that the new software load is available so that device 105 may initiate the upgrade process during an upgrade time window selected at a later time based on the conditions stored in condition set 205.

When the load available from server 110 and the load operating on device 105 are different from each other, upgrade module 215 is also operable to download the software load from server 110 onto device 105, where the software load is activated and begins operating.

For one embodiment, upgrade module 215 may also be operable to place device 105 in a prioritized mode during the software upgrade process such that only high priority operations may be performed by device 105 while the upgrade is being performed. For example, for the embodiment in which system 100 comprises a wireless communication network and at least one of devices 105 comprises a base station, upgrade module 215 may be operable to place the base station in a prioritized mode such that only high priority calls may be established and/or allowed to continue during the software upgrade process.

FIG. 3 is a flow diagram illustrating a method 300 for providing device-initiated software upgrades in system 100 according to the principles of the present invention. Initially, an operator stores conditions and may store corresponding significance values in condition set 205 (process step 305). For another embodiment, CMSM 120 may also learn new conditions to store in condition set 205 while device 105 is operating.

Time window identifier 210 monitors conditions in device 105 (process step 310) in order to identify an upgrade time window. Time window identifier 210 identifies the upgrade time window based on some conditions that call for a software upgrade for device 105 and based on other conditions that cause time window identifier 210 to determine that device 105 may initiate the software upgrade process within that upgrade time window with the least interference with the operation of device 105 (process step 315).

Once the upgrade time window identified by time window identifier 210 is reached (process step 320), upgrade module 215 contacts server 110 to begin communication with server 110 (process step 325). For example, upgrade module 215 may cause device 105 to connect to server 110 through network 115 such that device 105 and server 110 may communicate. Upgrade module 215 then obtains software load information from server 110 (process step 330). The software load information may comprise, for example, a version number for the software load, a bug fix report and/or any other suitable information operable to identify the software load.

Based on the software load information obtained from server 110, upgrade module 215 determines whether the load available from server 110 is different from the load already operating on device 105 (process step 335). If the loads are the same, upgrade module 215 submits a new software load request to server 110 and may submit a device report to sever 110 that is operable to provide the current operating status of device 105 (process step 340).

At this point, the method comes to an end. However, it will be understood that CMSM 120 may reattempt the software upgrade process after server 110 has had time to be updated with a different load. For one embodiment, upgrade module 215 may send a reattempt signal to time window identifier 210 that is operable to notify time window identifier 210 of the absence of an updated software load in server 110 such that time window identifier 210 may delay for a specified period of time before identifying a new upgrade time window for the reattempt.

If upgrade module 215 determines that the load available from server 110 and the load operating on device 105 are different from each other (process step 335), upgrade module 215 downloads the software load from server 110 onto device 105, where the software load is activated and begins operating (process step 345).

Although the present invention has been described with an exemplary embodiment, various changes and modifications may be suggested to one skilled in the art. It is intended that the present invention encompass such changes and modifications as fall within the scope of the appended claims.

What is claimed is:

1. A method for providing device-initiated software upgrades in a network comprising a plurality of devices, comprising:
   monitoring in the device one or more conditions in the device;
   identifying in the device an upgrade time window based on a match between the one or more conditions in the device and at least a portion of a set of predetermined conditions stored in the device, wherein the one or more conditions comprise upgrade need conditions and upgrade time conditions, and wherein upgrade need conditions comprise both needed and desired upgrades, and wherein each match is further based upon a significance value that corresponds to each upgrade need; and
   initiating in the device a software upgrade during the upgrade time window.

2. The method as set forth in claim 1, initiating the software upgrade comprising placing the device in a prioritized mode during the software upgrade.

3. The method as set forth in claim 2, initiating the software upgrade further comprising connecting the device to a server, the server operable to store a software load for the device, obtaining software load information from the server, and determining whether the software load stored in the server for the device comprises a different software load from a software load stored in the device based on the software load information.

4. The method as set forth in claim 3, further comprising downloading onto the device the software load stored in the server for the device when the software load stored in the server for the device comprises a different software load from the software load stored in the device.

5. The method as set forth in claim 3, further comprising submitting a new software load request to the server when the software load stored in the server for the device comprises a same software load as the software load stored in the device.

6. The method as set forth in claim 5, further comprising submitting a device report to the server when the software load stored in the server for the device comprises the same software load as the software load stored in the device.

7. The method as set forth in claim 1, at least a portion of the predetermined conditions comprising corresponding significance values, identifying the upgrade time window further comprising identifying the upgrade time window based on the significance values.

8. For use in a network comprising a plurality of devices, a network device comprising:
a condition monitoring software module executed in the network device, the condition monitoring software module for providing device initiated upgrades comprising:
a condition set operable to store a plurality of predetermined conditions, wherein the condition set comprises upgrade need conditions and upgrade time conditions, and wherein upgrade need conditions comprise both needed and desired upgrades;
a time window identifier coupled to the condition set, the time window identifier operable to monitor conditions for the device and to identify an upgrade time window based on a match between at least a first portion of the predetermined conditions stored in the condition set and the monitored conditions, and wherein each match is further based upon a significance value that corresponds to each upgrade need; and
an upgrade module coupled to the time window identifier, the upgrade module operable to initiate a software upgrade for the device during the upgrade time window identified by the time window identifier.

9. The network device as set forth in claim 8, the upgrade module operable to initiate the software upgrade by connecting the device to a server, the server operable to store a software load for the device, the upgrade module further operable to initiate the software upgrade by obtaining software load information from the server and determining whether the software load stored in the server for the device comprises a different software load from a software load stored in the device based on the software load information.

10. The network device as set forth in claim 9, the upgrade module further operable to download onto the device the software load stored in the server for the device when the software load stored in the server for the device comprises a different software load from the software load stored in the device.

11. The network device as set forth in claim 9, the upgrade module further operable to submit a new software load request to the server when the software load stored in the server for the device comprises a same software load as the software load stored in the device.

12. The network device as set forth in claim 11, the upgrade module further operable to submit a device report to the server when the software load stored in the server for the device comprises the same software load as the software load stored in the device.

13. The network device as set forth in claim 11, the upgrade module further operable to send a reattempt signal to the time window identifier when the software load stored in the server for the device comprises the same software load as the software load stored in the device and the time window identifier further operable to delay for a specified period of time before identifying a subsequent upgrade time window.

14. The network device as set forth in claim 8, at least a second portion of the predetermined conditions comprising corresponding significance values, the time window identifier further operable to identify the upgrade time window based on the significance values.

15. A network capable of providing device-initiated software upgrades, comprising:
a server operable to store a plurality of software loads; and
a plurality of devices coupled to the server, each device comprising a condition monitoring software module for providing device-initiated software upgrades in the device, the condition monitoring software module comprising (i) a time window identifier operable to monitor conditions for the device and to identify an upgrade time window based on a match between at least a first portion of predetermined conditions stored in the device and the monitored conditions and (ii) an upgrade module coupled to the time window identifier, the upgrade module operable to initiate a software upgrade for the device during the upgrade time window identified by the time window identifier, wherein conditions stored in the condition monitoring software module comprise upgrade need conditions and upgrade time conditions, and wherein upgrade need conditions comprise both needed and desired upgrades, and wherein each match is further based upon a significance value that corresponds to each upgrade need.

16. The network as set forth in claim 15, the upgrade module operable to initiate the software upgrade by connecting the device to the server, obtaining software load information from the server, and determining whether the software load stored in the server for the device comprises a different software load from a software load stored in the device based on the software load information.

17. The network as set forth in claim 16, the upgrade module further operable to download onto the device the software load stored in the server for the device when the software load stored in the server for the device comprises a different software load from the software load stored in the device.

18. The network as set forth in claim 16, the upgrade module further operable to submit a new software load request and a device report to the server when the software load stored in the server for the device comprises a same software load as the software load stored in the device.

19. The network as set forth in claim 15, at least a second portion of the predetermined conditions comprising corresponding significance values, the time window identifier further operable to identify the upgrade time window based on the significance values.

20. The network as set forth in claim 15, wherein the need conditions comprise at least one member selected from the group of a number of critical faults, major faults, critical alarms, and major alarms.

* * * * *